Feb. 2, 1932.  W. R. COLLINGS  1,843,867
METHOD OF SEPARATING CALCIUM CHLORIDE AND MAGNESIUM CHLORIDE FROM MIXED SOLUTIONS THEREOF
Original Filed Sept. 6, 1928
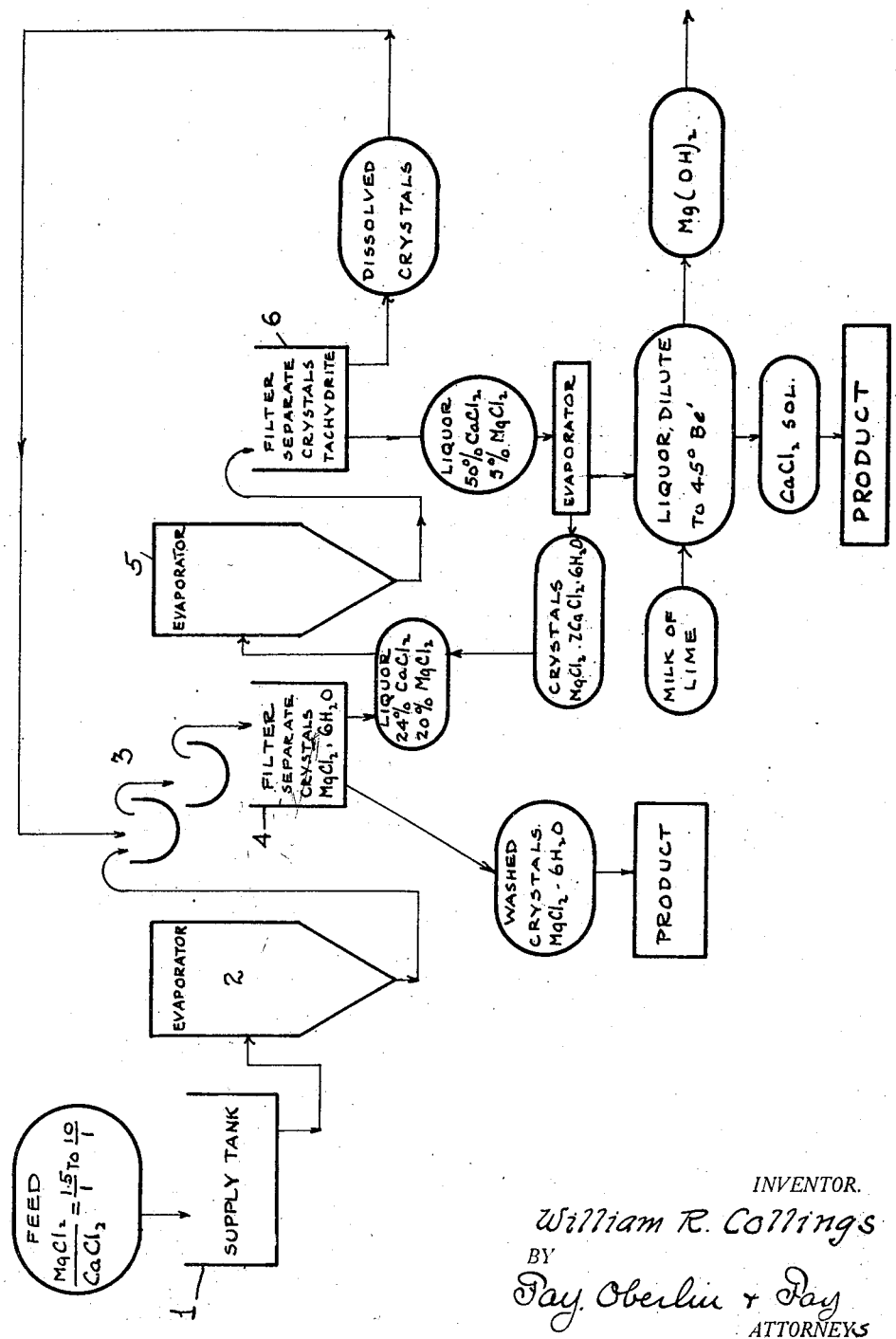
INVENTOR.
William R. Collings
BY
Day, Oberlin + Day
ATTORNEYS Patented Feb. 2, 1932

1,843,867

UNITED STATES PATENT OFFICE

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN

METHOD OF SEPARATING CALCIUM CHLORIDE AND MAGNESIUM CHLORIDE FROM MIXED SOLUTIONS THEREOF

Application filed September 6, 1928, Serial No. 304,339. Renewed May 31, 1930.

In U. S. Letters Patent, No. 1,627,068 to A. K. Smith and C. F. Prutton, dated May 3, 1927, there is disclosed an improved method or process for treating brines which contain calcium and magnesium chlorides with the object of separating such chlorides from each other. Incidentally to such process the calcium and magnesium chlorides, at least in part, are crystallized out of the solution in the form of a double salt known as tachydrite ($CaCl_2.2MgCl_2.12H_2O$). These crystals are then separated from the mother liquor and by appropriate treatment the calcium chloride content may be separated from the magnesium chloride and the latter purified. An improved procedure for treating such tachydrite crystals is further disclosed in a pending application of the present inventor, Serial No. 250,822, filed January 21, 1928.

As typical of a brine or mixed solution of calcium chloride and magnesium chloride, for the treatment of which the aforesaid patented process is adapted, reference is made in said patent to so-called Midland brine which, after removal of the sodium chloride and minor impurities, has approximately a composition of 11 per cent. magnesium chloride and 33 per cent. calcium chloride, i. e., in a ratio of one to three. The ratio of these two chlorides to each other is, of course, approximately the same in the raw brine and the procedure prescribed in the patent for treatment of the brines of the character described is stated to be particularly applicable to any brine wherein the weight of magnesium chloride is not less than 9.5 per cent. of the weight of the calcium chloride present in the brine, both figured as anhydrous salts.

As just stated, therefore, the process disclosed in the aforementioned patent is adapted to the treatment of brines containing magnesium chloride and calcium chloride in which the minimum proportion of the former to the latter is approximately in the ratio of one to ten. On the other hand it has been found that the upper limit of the range within which the process can be effectively employed is represented by a ratio of magnesium chloride to calcium chloride of approximately one and one-half to one.

It has now been discovered that certain modifications may be advantageously made in the sequence of the several steps described and claimed in the aforesaid Letters Patent and pending application when it is desired to separate magnesium chloride from calcium chloride in solutions containing the two salts in ratios by weight substantially different from those referred to above. The present improved method or process accordingly has as its object to provide for the effective separation of such chlorides from a solution or brine in which they are originally present in a ratio by weight of between one and one-half and ten parts of magnesium chloride to one part of calcium chloride, figured on the basis of the anhydrous salts.

To the accomplishment of the foregoing and related ends, the invention, then, consists of the steps hereinafter fully described and particularly pointed out in the claims, the annexed drawing and the following description illustrating and setting forth in detail certain steps embodying the invention, such disclosed means constituting, however, but several of the ways in which the principle of the invention may be used.

In said annexed drawing:—

The single figure there appearing is a diagrammatic representation on the order of a flow sheet illustrating the apparatus and steps employed in carrying out the present improved process.

So far as the present process is concerned, it is of course a matter of indifference from what source or in what manner the solution of magnesium and calcium chlorides employed therein is derived. It will be understood, therefore, that when a natural brine or bittern or a solution containing sodium chloride, in addition to the magnesium and calcium chlorides, is employed the sodium chloride will be first salted out by well known means of concentration.

When an aqueous solution of magnesium and calcium chlorides, in which the former is present in substantial excess, e. g., in the proportion of between one and one-half and ten parts of magnesium chloride to one part of calcium chloride, is concentrated sufficiently, a quantity of crystals of magnesium chloride hexahydrate, $MgCl_2.6H_2O$ will be precipitated, leaving a mother liquor richer in calcium than in magnesium chloride. The crystals are washed and thus directly yield a substantially pure product. The mother liquor may then be worked up for a further separation of the magnesium and calcium chlorides remaining dissolved therein according to the process of the aforesaid U. S. patent and pending application.

According to the present process, the solution containing the magnesium and calcium chlorides in approximately the proportions stated, after having received a preliminary treatment, if necessary, for the segregation of sodium chloride, is received in a supply tank 1, from which it is withdrawn as required to an evaporator 2 wherein it is concentrated to the point such that, when a sample is cooled to 30° C. and filtered from the crystals thereupon formed, the filtrate will have a gravity of from 42.5° to 43° Bé. The contents of the evaporator are discharged to one or more crystallizers 3, wherein the mass is stirred while being cooled to approximately 30° C., and a quantity of crystals of magnesium chloride hexahydrate, $MgCl_2.6H_2O$, is produced. The crystals and mother liquor are then transferred to a filter tank 4 wherein separation is effected and the crystals washed to purify them from adhering mother liquor.

The mother liquor from filter 4 containing approximately 20 per cent. $MgCl_2$ and 24 per cent. $CaCl_2$, is pumped to evaporator 5, and concentrated under a high vacuum, i. e., within about one inch of barometer, and at a temperature below 100° C., to precipitate crystals of tachydrite, $CaCl_2.2MgCl_2.12H_2O$. Evaporation is continued until the mother liquor after separation from the crystals has a gravity of 52° Bé. The crystal slurry is discharged to filter tank 6, wherein separation of crystals and mother liquor occurs. The former are washed to free them from adherent mother liquor and dissolved in a limited amount of water with heating to 90° to 100° C. such that the resultant solution has the same gravity as the liquor from evaporator 2. Such solution is thereupon returned to crystallizers 3, wherein upon cooling crystals of hexahydrate salt ($MgCl_2.6H_2O$) are formed and added to those produced in the previous operation. The mother liquor from filter 6 has a gravity of approximately 52° Bé., and contains 50 to 53 per cent. $CaCl_2$ and approximately 5 per cent. $MgCl_2$. The $MgCl_2$ content thereof may be brought to about two per cent. by evaporating under reduced pressure, e. g., with a 10 inch vacuum, up to a temperature of 155° C., whereupon crystals of composition $MgCl_2.2CaCl_2.6H_2O$ are formed, and may be separated and returned to the feed to evaporator 5. The filtrate from such crystals is diluted to 45° Bé. and treated with milk of lime to precipitate the last residue of magnesium chloride as magnesium hydroxide, which is filtered off, leaving a filtrate consisting of a substantially pure solution of calcium chloride. The latter, constituting the calcium chloride product of the present process, is finished according to the usual methods.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a process of separating magnesium and calcium chlorides in a solution wherein said chlorides are present in the proportion of between one and one half and ten parts of the former to one part of the latter, the steps which consist in evaporating such solution to precipitate crystals of magnesium chloride hexahydrate; separating such crystals from the mother liquor, evaporating the residual liquor in vacuo at a temperature below 100° C.; separating crystals of tachydrite thereby formed; dissolving the latter crystals in a limited amount of water with heating; cooling to crystallize a further portion of hexahydrate crystals; and treating the mother liquor from such tachydrite crystals to remove the last traces of magnesium chloride, leaving a solution of calcium chloride.

2. In a process of separating magnesium and calcium chlorides in a solution wherein said chlorides are present in the proportion of between one and one half and ten parts of the former to one part of the latter, the steps which consist in concentrating such solution by evaporation to the point such that when cooled to 30° C. and filtered from the crystals thereupon formed the filtrate will have a gravity of from 42.5° to 43° Bé.; cooling to approximately 30° C., separating crystals of magnesium chloride hexahydrate; evaporating the residual liquor in vacuo at a temperature below 100° C.; separating crystals of tachydrite; dissolving such crystals in a limited amount of water with heating; returning such solution to the previous cooling step for the precipitation of magnesium chloride hexahydrate crystals therefrom; and treating the mother liquor from such tachydrite crystals to remove the last traces of magnesium chloride, leaving a solution of calcium chloride.

3. The process of separating magnesium and calcium chlorides in a solution wherein said chlorides are present in the proportion of between one and one half and ten parts of the former to one part of the latter, which comprises crystallizing a portion of the magnesium chloride as the hexahydrate salt; crystallizing a further portion of same as tachydrite; dissolving such tachydrite in a limited amount of water and crystallizing from the so formed solution a second portion of magnesium chloride hexahydrate.

4. The process of separating magnesium and calcium chlorides in a solution wherein said chlorides are present in the proportion of between one and one half and ten parts of the former to one part of the latter, which comprises crystallizing a portion of the magnesium chloride as the hexahydrate salt; crystallizing a further portion of same as tachydrite; dissolving such tachydrite in a limited amount of water and crystallizing from the so formed solution a second portion of magnesium chloride hexahydrate; and treating the mother liquor from such tachydrite crystals for the removal of the last portion of magnesium chloride, leaving a solution of calcium chloride.

5. In a process of separating magnesium and calcium chlorides in a solution wherein said chlorides are present in the proportion of between one and one-half and ten parts of the former to one part of the latter, the steps which consist in concentrating such solution to the point such that when cooled to 30° C. and filtered from the crystals thereupon formed the filtrate will have a gravity of from 42.5° to 43° Bé.; cooling to approximately 30° C., separating crystals of magnesium chloride hexahydrate; evaporating the residual liquor in vacuo at a temperature below 100° C.; separating crystals of tachydrite; dissolving such crystals in a limited amount of water with heating; returning such solution to the previous cooling step for the precipitation of magnesium chloride hexahydrate crystals therefrom; evaporating the mother liquor from such tachydrite crystals under reduced pressure to a temperature of 155° C.; separating crystals of $MgCl_2.2CaCl_2.6H_2O$; treating the final mother liquor with milk of lime and filtering magnesium hydroxide from the solution of calcium chloride.

Signed by me this 15th day of August, 1928.

WILLIAM R. COLLINGS.